United States Patent [19]

Gruden

[11] Patent Number: 4,485,783
[45] Date of Patent: Dec. 4, 1984

[54] INTERNAL COMBUSTION ENGINE OF THE OTTO-TYPE OF CONSTRUCTION WITH AN IGNITION DISTRIBUTOR AND WITH AN ELECTRONIC IGNITION POINT-PERFORMANCE CHARACTERISTICS STORAGE DEVICE

[75] Inventor: Dusan Gruden, Ditzingen, Fed. Rep. of Germany

[73] Assignee: Dr. Ing. h.c.F. Porsche Aktiengesellschaft, Stuttgart, Fed. Rep. of Germany

[21] Appl. No.: 440,959

[22] Filed: Nov. 12, 1982

[30] Foreign Application Priority Data

Nov. 11, 1981 [DE] Fed. Rep. of Germany ....... 3144733

[51] Int. Cl.³ ............................................... F02P 5/14
[52] U.S. Cl. .................................. 123/406; 123/198 R
[58] Field of Search ............ 123/1 R, 198 R, 146.5 A, 123/406, 415, 416, 417

[56] References Cited

U.S. PATENT DOCUMENTS 3,750,635  8/1973  Hoffman et al. .................... 123/357
4,013,050  3/1977  Lace ................................... 123/406
4,399,780  8/1983  Lassanske et al. .................. 123/406

Primary Examiner—Parshotam S. Lall
Assistant Examiner—W. R. Wolfe
Attorney, Agent, or Firm—Craig & Burns

[57] ABSTRACT

An internal combustion engine of Otto-type of construction with an ignition distributor and with an electronic ignition point-performance graph storage device, which is connected to a fuel tank provided with a filler pipe by means of a fuel line; in order that an automatic adaptation of the instantaneously tanked type of fuel is possible, the ignition point-performance graph storage device is connected with a pulse transmitter coordinated to the filler pipe whereby the pulse transmitter cooperates with a device of a filling nozzle signalling the fuel quality so that the performance graph of the ignition point-performance graph storage device is matched to the octane number of the instantaneously tanked fuel.

4 Claims, 2 Drawing Figures

Fig.1

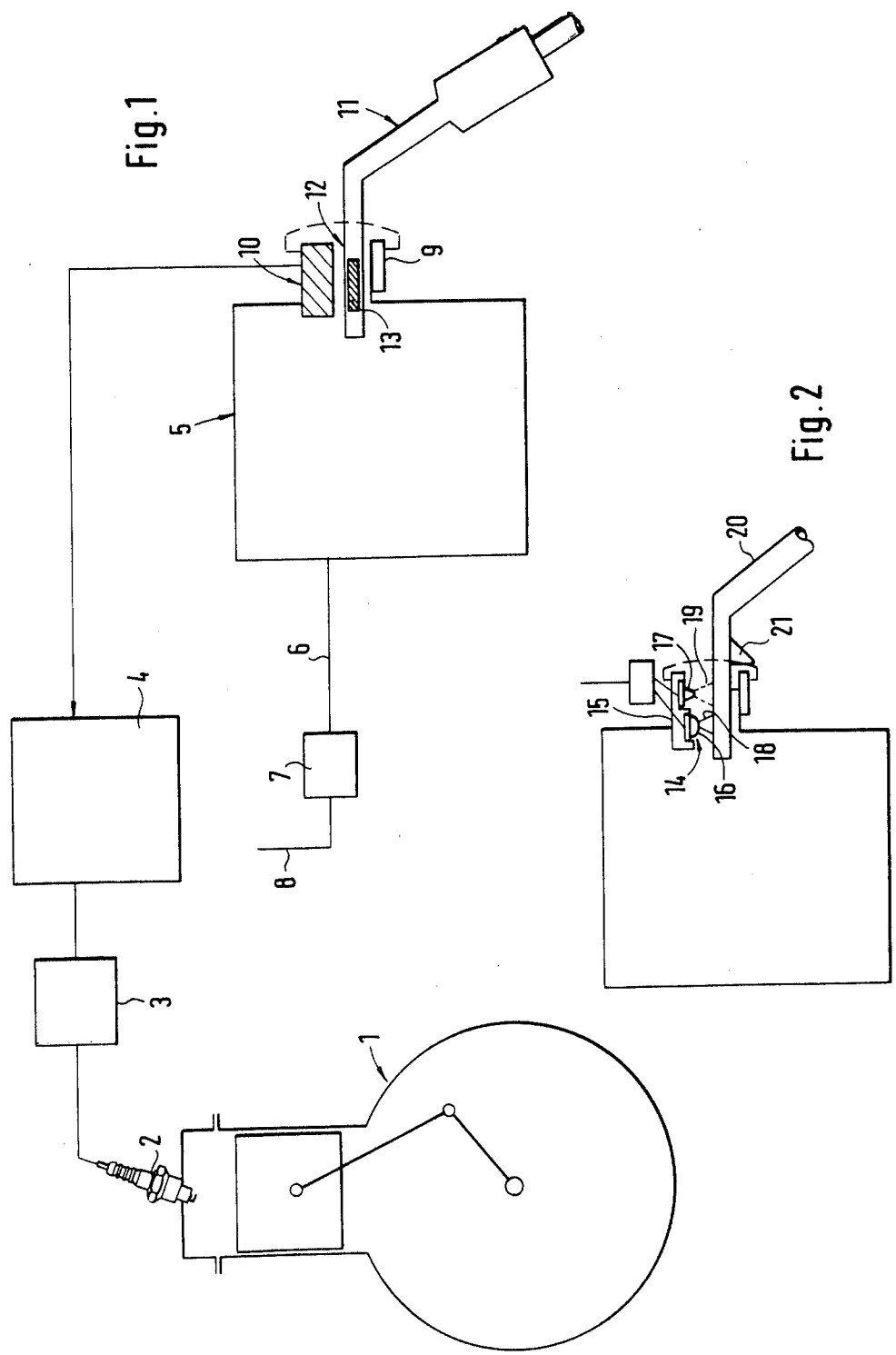

INTERNAL COMBUSTION ENGINE OF THE OTTO-TYPE OF CONSTRUCTION WITH AN IGNITION DISTRIBUTOR AND WITH AN ELECTRONIC IGNITION POINT-PERFORMANCE CHARACTERISTICS STORAGE DEVICE

The present invention relates to an internal combustion engine of the Otto-type of construction with an ignition distributor and with an electronic ignition point-performance graph storage device, whereby the internal combustion engine is connected to a fuel tank having a filler pipe by means of a feed line.

Electronic ignition systems for internal combustion engines are known in which the possibility exists to store for the respective type of fuel—super or normal gasoline—the corresponding ignition point-performance graph in a control apparatus. This ignition point-performance graph is determined for one type of fuel, for example, for super or high octane gasoline so that the internal combustion engine cannot be operated with another type of fuel.

It is the object of the present invention to undertake such measures on an internal combustion engine including a fuel tank and provided with an ignition distributor and with an electronic ignition point-performance graph storage device that different types of fuel can be utilized.

The underlying problems are solved according to the present invention in that the ignition point-performance graph storage device is connected with a pulse transmitter coordinated to the filler pipe which is adapted to be influenced by a device provided at the filling nozzle of a tanking installation and signalling the fuel quality in such a manner that the performance chart of the ignition point-performance graph storage device is matched to the octane value of the momentarily tanked medium.

The advantages primarily achieved with the present invention reside in that the adaptation of the ignition point-performance graph to the respective type of fuel takes place automatically by a filling nozzle of a tanking installation whereby this measure is simple in handling and operationally reliable. As a result thereof, different types of fuel—super or normal fuel—can be utilized without problem for the operation of an internal combustion engine of a motor vehicle.

These and further objects, features and advantages of the present invention will become more apparent from the following description when taken in connection with the accompanying drawing which shows, for purposes of illustration only, two embodiments in accordance with the present invention and wherein:

FIG. 1 is a schematic view of an internal combustion engine having a fuel tank and equipped with a control installation according to the present invention; and FIG. 2 is a schematic view of a detail of FIG. 1 of a further embodiment of a control installation in accordance with the present invention.

Referring now to the drawing wherein like reference numerals are used throughout the two views to designate like parts, the internal combustion engine generally designated by reference numeral 1 (FIG. 1) operates according to the Otto-cycle—the valve actuation is not shown—and includes a spark plug 2, an ignition distributor 3, and an electronic ignition point-performance graph storage device 4 of any conventional construction. Reference numeral 5 generally designates a fuel tank which is connected with a fuel pump 7 by way of a line 6. The fuel pump 7 is operatively connected by way of a line 8 with a fuel-air-mixture-preparation device (not shown) of any conventional construction (injection system or carburetor).

The fuel tank 5 includes a filler pipe 9, to which is coordinated a pulse transmitter generally designated by reference numeral 10. The pulse transmitter 10 is operatively connected with the ignition point-performance graph storage device 4 by means of a line.

A filling nozzle 11 of a filling station (not shown) is introduced into the filler pipe 9. The introduced area generally designated by reference numeral 12 of the filling nozzle is provided with a device 13 which signals the instantaneously delivered fuel type (super or normal gasoline), respectively, fuel quality (octane number) to the pulse transmitter generally designated by reference numeral 10 and of any conventional construction. The pulse transmitter 10 switches the ignition point-performance graph storage device 4 automatically by means of this signal to a performance graph that corresponds to the corresponding type of fuel or fuel quality.

The signal transmission may take place inductively—as illustrated in FIG. 1. For that purpose, the installation 13 (signal transmitter) and the pulse transmitter 10 are correspondingly constructed.

However, the possibility also exists, as shown in FIG. 2, to provide a mechanical device generally designated by reference numeral 14. The latter includes mechanical contacts 16 and 17 at the pulse transmitter 15 which cooperate with contact projections 18 or 19 of the introduced filling nozzle 20. If, for example, the filling nozzle is introduced with the contact projection 18 (the contact projection 19 is missing now), normal fuel is signalled to the pulse transmitter 15; super fuel would be signalled by means of the contact projection 19. The abutment 21 at the filling nozzle 20 assures that the respective contact projection is positionally correctly aligned with a corresponding contact.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An internal combustion engine of the Otto-type construction, comprising an ignition distributor means, an electronic ignition point-performance graph storage means, a fuel tank having a filler pipe connected with the internal combustion engine by way of a feed line, characterized in that the ignition point-performance graph storage means is operatively connected with a pulse transmitter means coordinated to the filler pipe which is operable to be influenced by a signalling means signalling the fuel quality and provided at a filling nozzle of a filling station in such a manner that the performance graph of the ignition point-performance graph storage means is matched to the octane value of the then-tanked medium.

2. Internal combustion engine according to claim 1, characterized in that the signalling means includes a signal transmitter means inductively influencing the pulse transmitter means.

3. An internal combustion engine according to claim 1, characterized in that the signalling means and the pulse transmitter means are operatively connected with each other by way of a mechanical contact means.

4. An internal combustion engine according to claim 3, characterized in that the contact means include contact members operable to cooperate with contact projections at the filling nozzle.

* * * * *